(12) United States Patent
Wen et al.

(10) Patent No.: US 7,773,816 B2
(45) Date of Patent: Aug. 10, 2010

(54) SYSTEMS AND METHODS FOR DECODING LARGE IMAGES

(75) Inventors: Ching-Hua Wen, Bade (TW); Po Chun Huang, Chubei (TW); Shao-Lun Li, Kao-Hsiung (TW)

(73) Assignee: Mediatek Inc., Hsin-Chu (TW)

( * ) Notice: Subject to any disclaimer, the term of this patent is extended or adjusted under 35 U.S.C. 154(b) by 1150 days.

(21) Appl. No.: 11/279,931

(22) Filed: Apr. 17, 2006

(65) Prior Publication Data

US 2007/0242890 A1    Oct. 18, 2007

(51) Int. Cl.
*G06K 9/36* (2006.01)
(52) U.S. Cl. .................................. 382/233
(58) Field of Classification Search ......... 382/232–233, 382/236, 238–253; 348/393.1–416.1, 420.1–421.1; 375/420.02–240.25; 358/426.13–426.16
See application file for complete search history.

(56) References Cited

U.S. PATENT DOCUMENTS

| | | | |
|---|---|---|---|
| 5,543,861 A | 8/1996 | Harradine et al. ........... 348/718 |
| 5,647,049 A * | 7/1997 | Odaka et al. ................ 386/124 |
| 6,289,138 B1 * | 9/2001 | Yip et al. .................... 382/307 |
| 6,580,828 B1 * | 6/2003 | Li ............................... 382/233 |
| 6,757,439 B2 | 6/2004 | Leeder et al. ............... 382/246 |

* cited by examiner

*Primary Examiner*—Jose L Couso
(74) *Attorney, Agent, or Firm*—Thomas, Kayden, Horstemeyer & Risley

(57) ABSTRACT

An embodiment of a method for decoding large images performed by a processing unit, comprises the following steps. A compressed bit stream of a minimum code unit (MCU) of an image is acquired. The acquired bit stream is decoded by performing a first stage of a image decoding procedure to generate a temporary decoding result of the acquired bit stream. It is determined whether the MCU requires display. If so, the generated temporary decoding result is decoded by performing a second stage of the image decoding procedure to generate display data of the acquired bit stream. The temporary decoding result of the acquired bit stream is utilized to decode another MCU of the bit stream.

20 Claims, 20 Drawing Sheets

| 2 | 2 | 2 | 5 | 10 | 10 | 10 | 10 |
|---|---|---|---|----|----|----|----|
| 2 | 2 | 2 | 3 | 7  | 10 | 10 | 10 |
| 2 | 2 | 3 | 6 | 10 | 10 | 10 | 10 |
| 2 | 3 | 5 | 7 | 10 | 10 | 10 | 10 |
| 10 | 10 | 10 | 10 | 10 | 10 | 10 | 10 |
| 10 | 10 | 10 | 10 | 10 | 10 | 10 | 10 |
| 10 | 10 | 10 | 10 | 10 | 10 | 10 | 10 |
| 10 | 10 | 10 | 10 | 10 | 10 | 10 | 10 |

| 2 | 1 | 1 | 1 | 2 | 2 | 5 | 7 |
|---|---|---|---|---|---|---|---|
| 1 | 1 | 1 | 2 | 2 | 4 | 6 | 9 |
| 1 | 1 | 2 | 2 | 4 | 6 | 8 | 10 |
| 2 | 2 | 2 | 3 | 6 | 6 | 9 | 10 |
| 2 | 2 | 3 | 4 | 5 | 7 | 8 | 10 | 11 |
| 4 | 6 | 6 | 9 | 11 | 10 | 12 | 10 |
| 5 | 6 | 7 | 8 | 10 | 11 | 12 | 10 |
| 6 | 6 | 6 | 6 | 8 | 9 | 10 | 10 |

| run/size | length of code word | code word |
|---|---|---|
| 0/0 | 4 | 1010 |
| 0/1 | 2 | 00 |
| 0/2 | 2 | 01 |
| 0/3 | 3 | 100 |
| 0/4 | 4 | 1011 |
| 0/5 | 5 | 11010 |
| 0/6 | 7 | 1111000 |
| ... | ... | ... |
| 1/4 | 9 | 111110110 |
| ... | ... | ... |
| F/0 | 11 | 11111111001 |
| F/1 | 16 | 1111111111110101 |
| ... | ... | ... |
| F/A | 16 | 1111111111111110 |

SYSTEMS AND METHODS FOR DECODING LARGE IMAGES

BACKGROUND

The invention relates to image decoding, and more particularly, to systems and methods for decoding large images.

Portable electronic devices such as mobile phones, personal digital assistants (PDAs), digital cameras, or similar, are typically equipped with still image decoders to decode compressed images such as Joint Photographic Experts Group (JPEG) images, but have relatively small screens for display of the decoded images. When viewing an image displayed on the small screen, the user prefers to zoom-in a particular portion of the image via keys on a keypad for detailed viewing.

When a user selects a portion of an image, an image decoding method fully decodes the entire image and displays the selected portion of the image on a screen. Decoding non-displayed portions of an image using this image decoding method, however, may be excessively time consuming.

Another image decoding method generates a thumbnail image (i.e. a reduced image) corresponding to an image, enlarges the selected portion of the thumbnail image and displays the enlarged image on a screen. This image decoding method, however, may offer reduced image quality, due to the enlarging process.

SUMMARY

Methods for decoding large images are provided. An embodiment of a method performed by a processing unit, comprises the following steps. A minimum code unit (MCU) of a compressed bit stream of an image is acquired. The acquired bit stream is decoded by performing a first stage of a image decoding procedure to generate a temporary decoding result of the acquired bit stream. It is determined whether the MCU requires display. If so, the generated temporary decoding result is decoded by performing a second stage of the described image decoding procedure to generate display data of the MCU.

Systems for decoding large images are provided. An embodiment of a system comprises a screen and a processing unit coupled thereto. The processing unit acquires a compressed bit stream of a minimum code unit of an image, decodes the acquired bit stream by performing a first stage of a image decoding procedure to generate a temporary decoding result of the acquired bit stream, determines whether the MCU requires display, and, if so, decodes the generated temporary decoding result by performing a second stage of the described image decoding procedure to generate display data of the acquired bit stream and displays the generated display data on the screen.

The temporary decoding result of the acquired bit stream is utilized to decode another MCU of the compressed bit stream.

BRIEF DESCRIPTION OF THE DRAWINGS

The present invention can be more fully understood by reading the subsequent detailed description and examples with references made to the accompanying drawings, wherein:

FIGS. 6*a* and 6*b* are diagrams of exemplary luminance and chrominance base tables;

FIG. 8 is a diagram of a zig-zag encoding order;

FIGS. 9*a* and 9*b* are diagrams of exemplary luminance DC difference mapping and luminance AC coefficient mapping tables;

DETAILED DESCRIPTION

Figure 1:
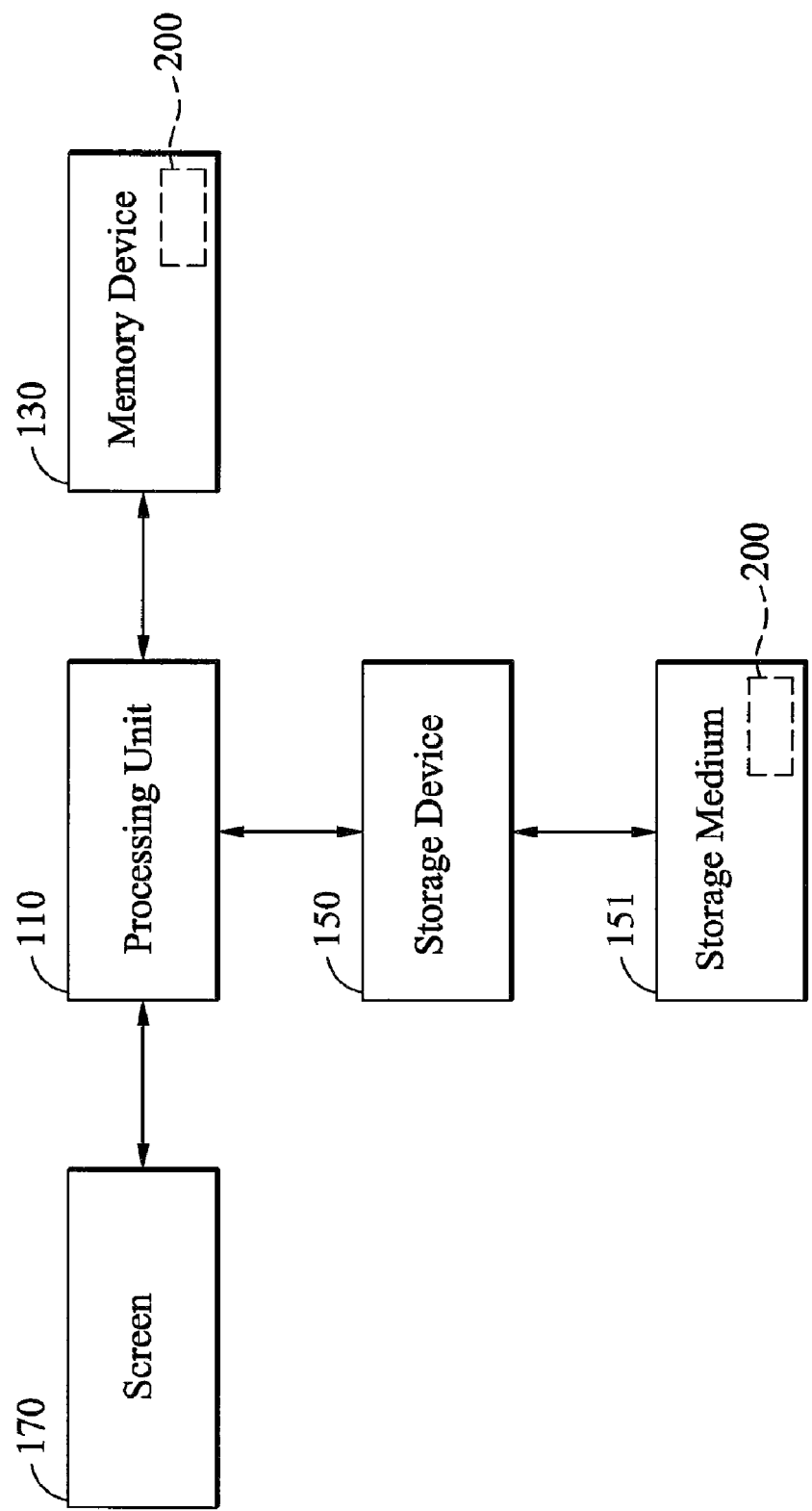
FIG. 1 is a diagram of a hardware environment applicable to a portable electronic device.

Methods for decoding compressed images employed in portable electronic devices such as mobile phones, personal digital assistants (PDAs), MP3 players, portable disk drives, programmable consumer electronics, portable multimedia players (PMP), and the like, are provided. FIG. 1 is a diagram of hardware environment applicable to a portable electronic device comprising a processing unit 110, a memory device 130 and a screen 170. A source image 200 is stored in the memory device 130 such as dynamic random access memory (DRAM), synchronous DRAM (SDRAM), flash memory device or similar, or a storage medium 151 such as a compact flash (CF), memory stick (MS), smart media (SM), or SD memory card or similar, loaded by a storage device 150. The source image 200, a compressed image such as a Joint Photographic Experts Group (JPEG) image, is larger than the screen 170 such as a color super-twisted nematic (CSTN) display, a thin film transistor-liquid crystal display (TFT-LCD), an organic light-emitting diode (LED) display or similar. Thus, when viewing the image on the relatively small screen, the user prefers to select a portion of the image for zooming in.

Figure 2:
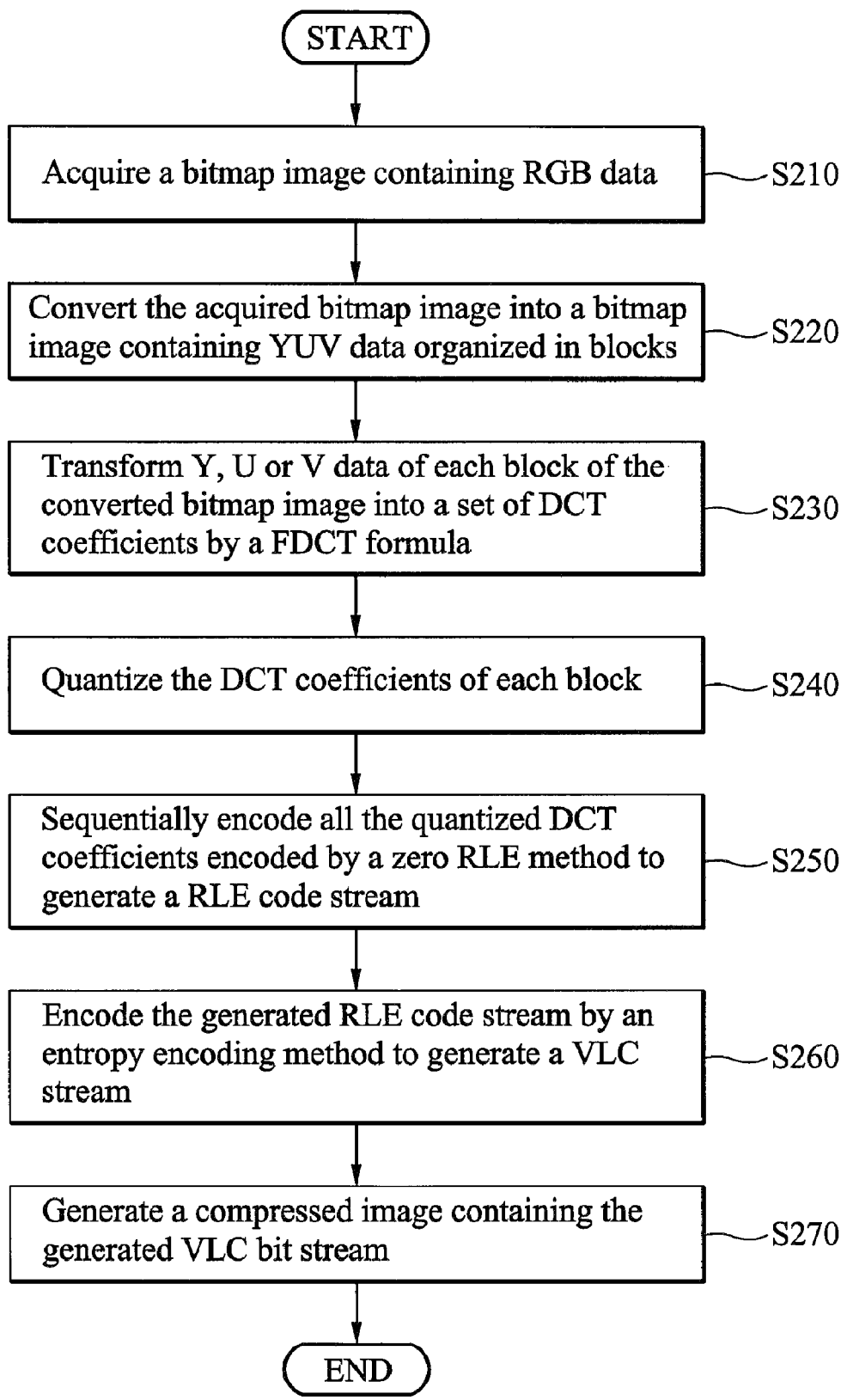
FIG. 2 is a flowchart illustrating an embodiment of an encoding process.
Figure 3:
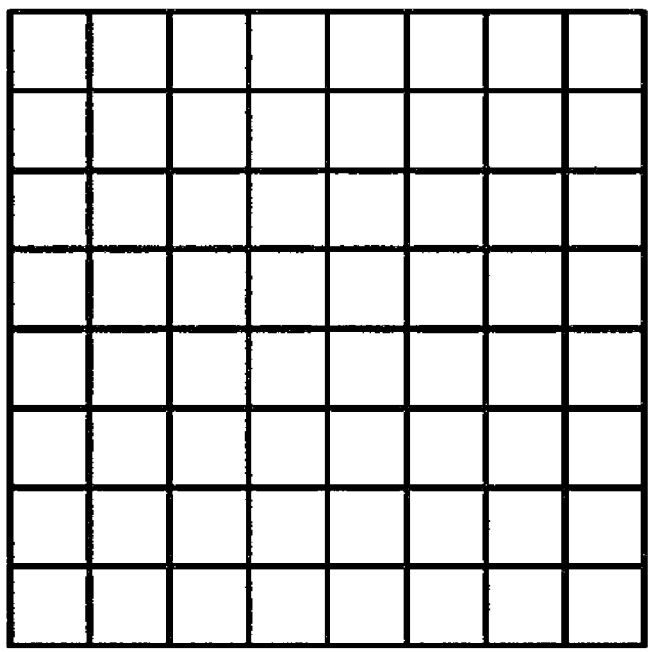
FIG. 3 is a diagram of an exemplary block.

FIG. 2 is a flowchart illustrating an embodiment of an encoding process for generation of the source image 200 (FIG. 1), performed by the processing unit 110 (FIG. 1). In step S210, a bitmap image containing RGB data is acquired. In step S220, the acquired bitmap image is converted into a bitmap image containing YUV data organized in blocks. Preferably, each block contains 8×8 pixels as shown in FIG. 3. YUV is one of two primary color spaces used to represent digital image component (the other is RGB). The difference between YUV and RGB is that YUV represents color as brightness and two color difference signals, while RGB represents color as red, green and blue. In YUV, the Y is the brightness (luminance), U is blue minus luminance (B-Y) and V is red minus luminance (R-Y).

Figure 4A:
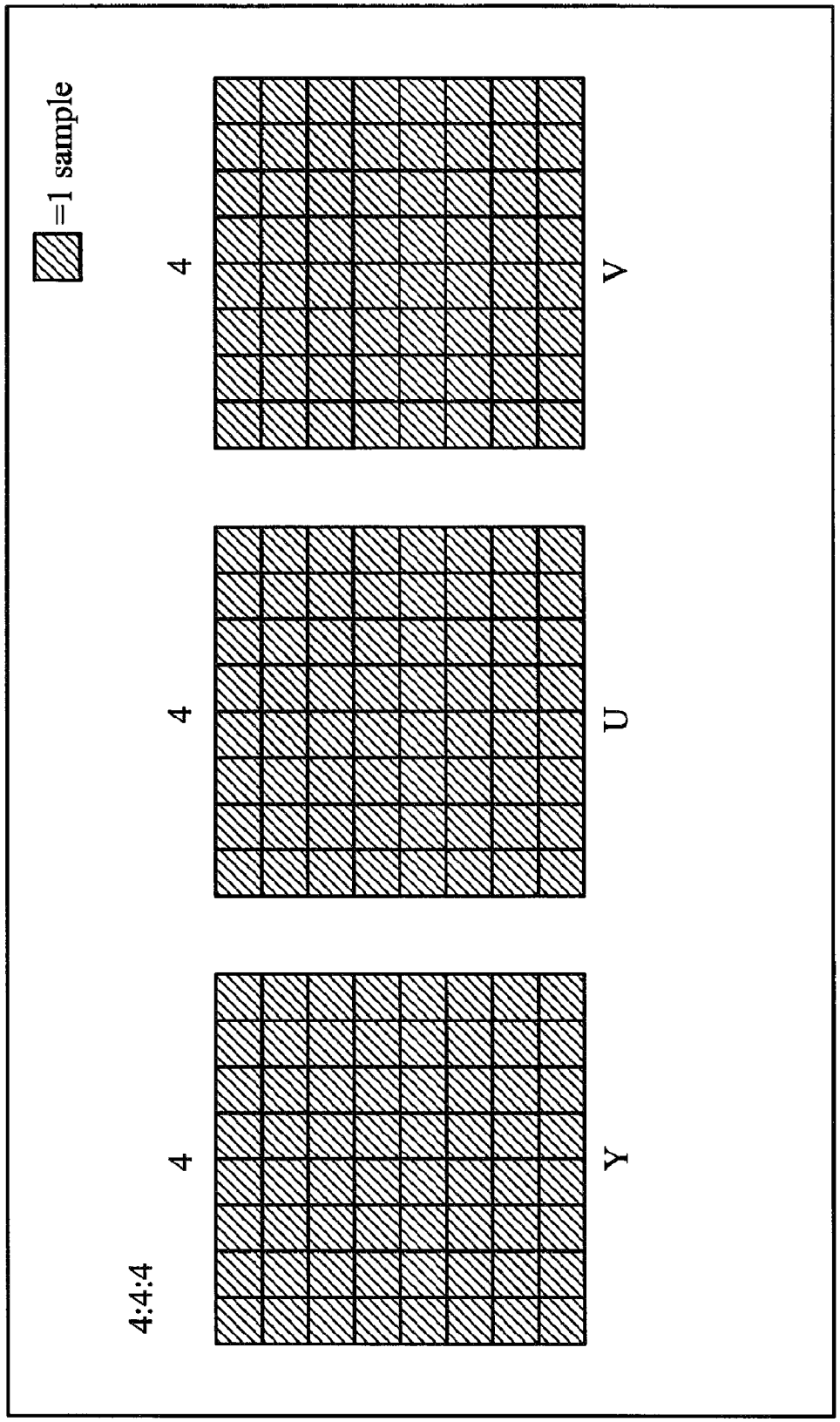
FIG. 4*a* is a diagram of exemplary 4:4:4 format.

In order to compress bandwidth, U and V may further be sampled at a lower rate than Y, which is technically known as "chrominance subsampling" or "chrominance down-sampling." Some color information in the image signal is being discarded, but not brightness (luminance) information. YUV is designated as "4:m:n". The "4" typically represents a sampling rate of 13.5 MHz, which is the standard frequency set forth by ITU-R BT.601 for digitizing analog NTSC, PAL and SECAM signals. The next two digits represent the U and V rate. Various image formats are further described with references made to the accompanying drawings. FIG. 4a is a diagram of exemplary 4:4:4 format, where U and V are sampled at the same full rate as the luminance. When employing 4:4:4 format, a minimum code unit (MCU), a minimum unit for subsequent encoding, may correspond to pixels of one or more blocks. An exemplary MCU corresponding to pixels of one block contains (Y,U,V). An exemplary MCU corresponding to pixels of two blocks contains ($Y_1,U_1,V_1,Y_2, U_2,V_2$). Content of an MCU corresponding to pixels of three or more blocks may be deduced by analogy.

Figure 4B:
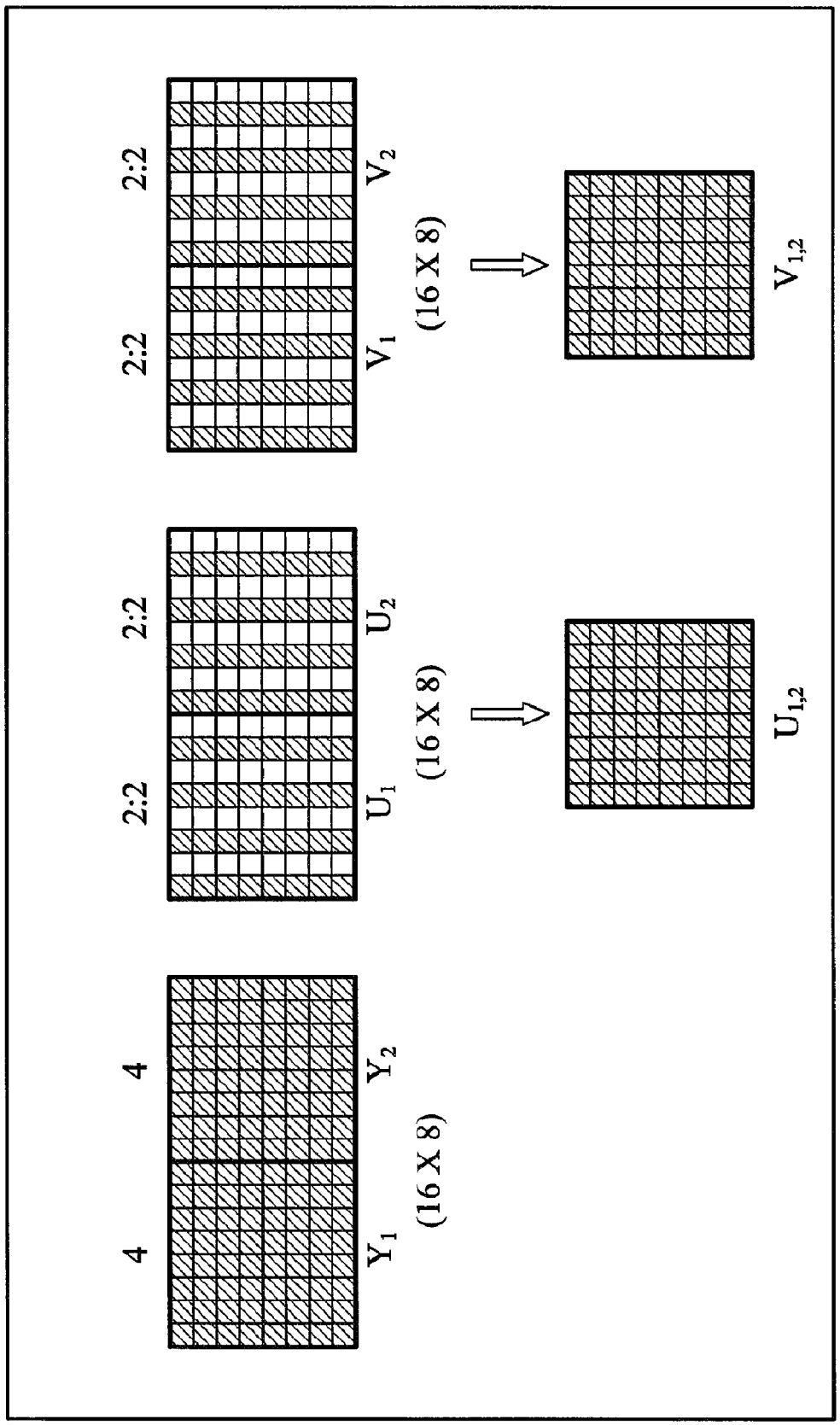
FIG. 4*b* is a diagram of exemplary 4:2:2 co-sited format.
Figure 4C:
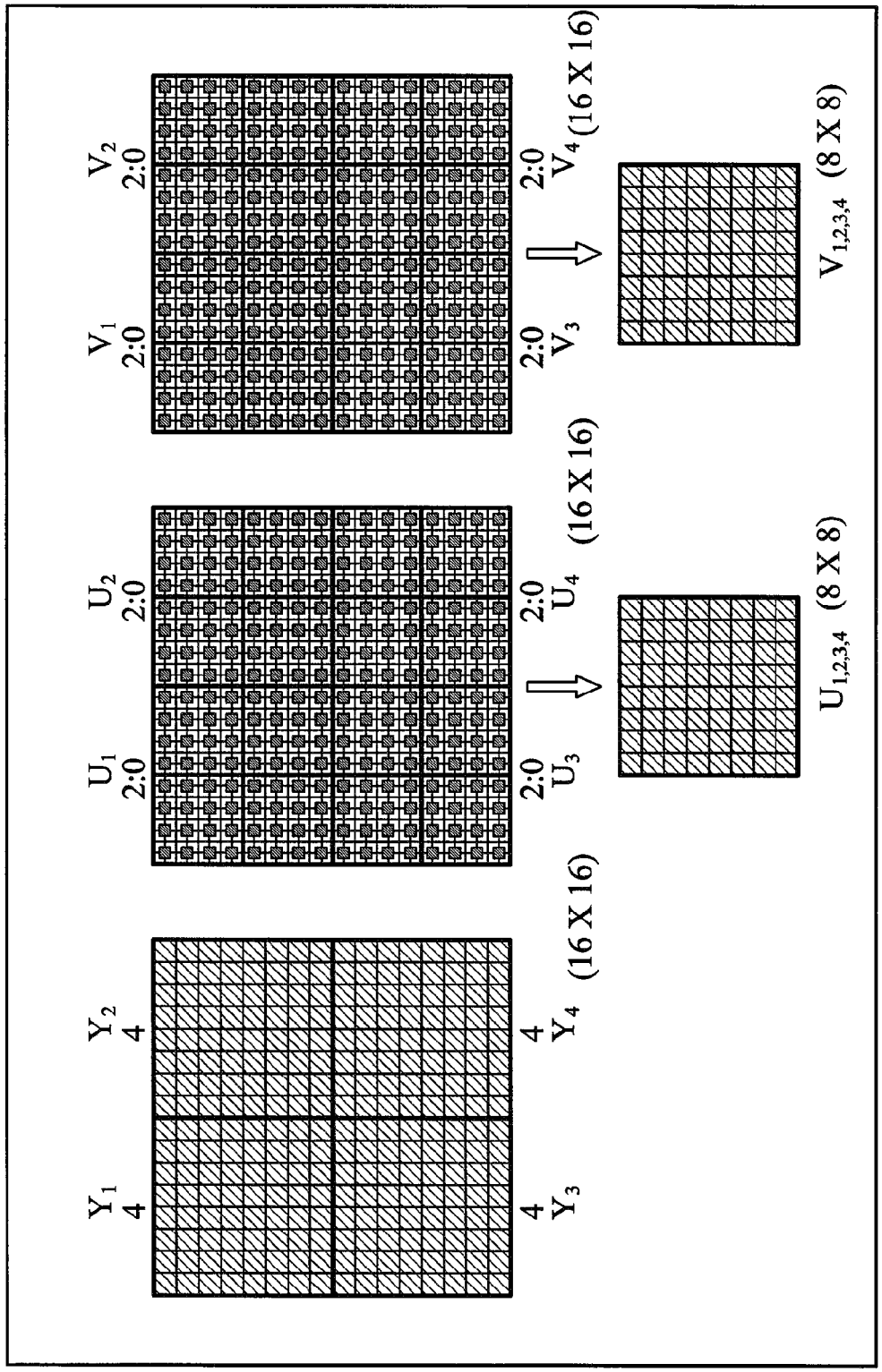
FIG. 4*c* is a diagram of exemplary 4:2:0 format.

FIG. 4b is a diagram of exemplary 4:2:2 co-sited format, where U and V are sampled at half of the horizontal resolution of Y. The term of "co-sited" means that U/V samples are taken at the same time as Y. When employing the 4:2:2 cc-sited format, an MCU may correspond to pixels of $2^n$ blocks, where n is an integer greater than zero. An exemplary MCU corresponding to pixels of two blocks contains ($Y_1,Y_2,U_{1,2}, V_{1,2}$). FIG. 4c is a diagram of exemplary 4:2:0 format, where the zero in 4:2:0 means that U and V may be sampled at half of the vertical resolution of Y. When employing 4:2:0 format, an MCU may correspond to pixels of $4^n$ blocks, where n is an integer greater than zero. An exemplary MCU corresponding to pixels of four blocks contains ($Y_1,Y_2,Y_3,Y_4,U_{1,2,3,4}, V_{1,2,3,4}$).

Figure 5:
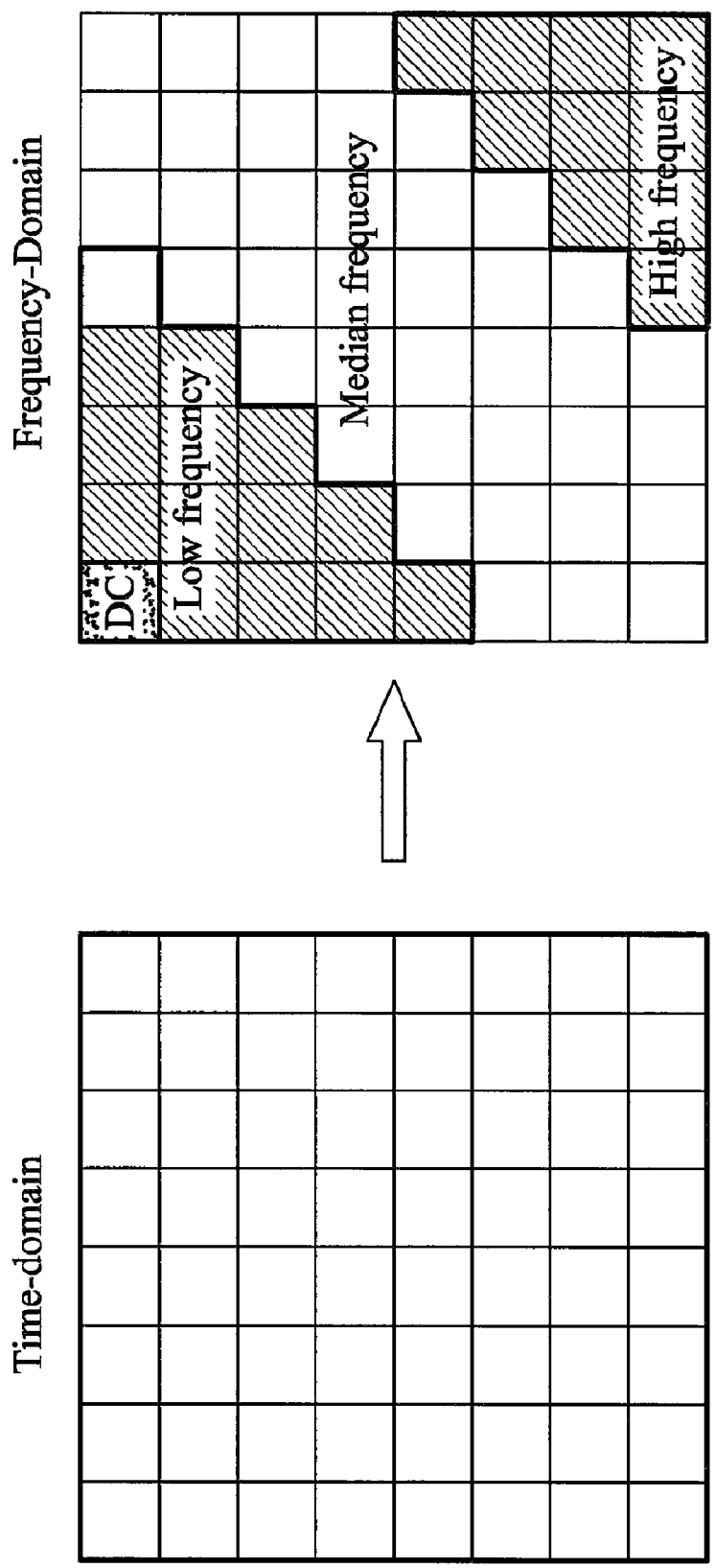
FIG. 5 is a schematic diagram of DCT for transforming a time-domain block into a frequency-domain block.

Referring to FIG. 2, in step S230, Y, U or V data of each block of the converted bitmap image is transformed into a set of frequencies (also called DCT coefficients) by a forward discrete cosine transform (FDCT) formula. When a block is composed of 8×8 pixels, frequency of each pixel in the block may be calculated by the following FDCT formula:

$$S_{vu} = \frac{1}{4} C_u C_v \sum_{x=0}^{7} \sum_{y=0}^{7} S_{yx} \cos\frac{(2x+1)u\pi}{16} \cos\frac{(2y+1)v\pi}{16},$$

where $C_u, C_v = 1/\sqrt{2}$ for u, v=0, $C_u, C_v = 1$ for otherwise, and $S_{yx}$ represents real data of Y, U or V of the y-th row and the x-th column of a block. The result is an 8×8 transform coefficient array in which the (0,0) element is the DC (zero-frequency) coefficient and entries with increasing vertical and horizontal index values represent higher vertical and horizontal spatial frequencies. Elements other than the (0,0) element in the resulting array are AC coefficients. FIG. 5 is a schematic diagram of DCT for transforming a time-domain block into a frequency-domain block.

Referring to FIG. 2, in step S240, the DCT coefficients of each block are quantized with reference to a predefined luminance base table and a predefined chrominance base table. FIG. 6a is an exemplary luminance base table 610 provided for quantizing luminance (Y) DCT coefficients. FIG. 6b is an exemplary chrominance base table 630 provided for quantizing chrominance (U or V) DCT coefficients. Step S240 divides each luminance or chrominance DCT coefficient in a block (i.e. a frequency-domain block) by a corresponding quantization scale (typically an integer) in a luminance base table or a chrominance base table, and then rounds the divided one to the nearest integer. Each luminance or chrominance DCT coefficient SVU may be quantized by the following quantization equation with reference to the luminance base table 610 or the chrominance base table 630:

$$Sq_{vu} = \text{round}\left(\frac{S_{vu}}{Q_{vu}}\right),$$

where $S_{vu}$ represents a luminance or chrominance DCT coefficient of the v-th row and the u th column, and $Q_{vu}$ represents a quantization scale of the v-th row and the u-th column present in the luminance base table 610 or the chrominance base table 630.

Figure 7:
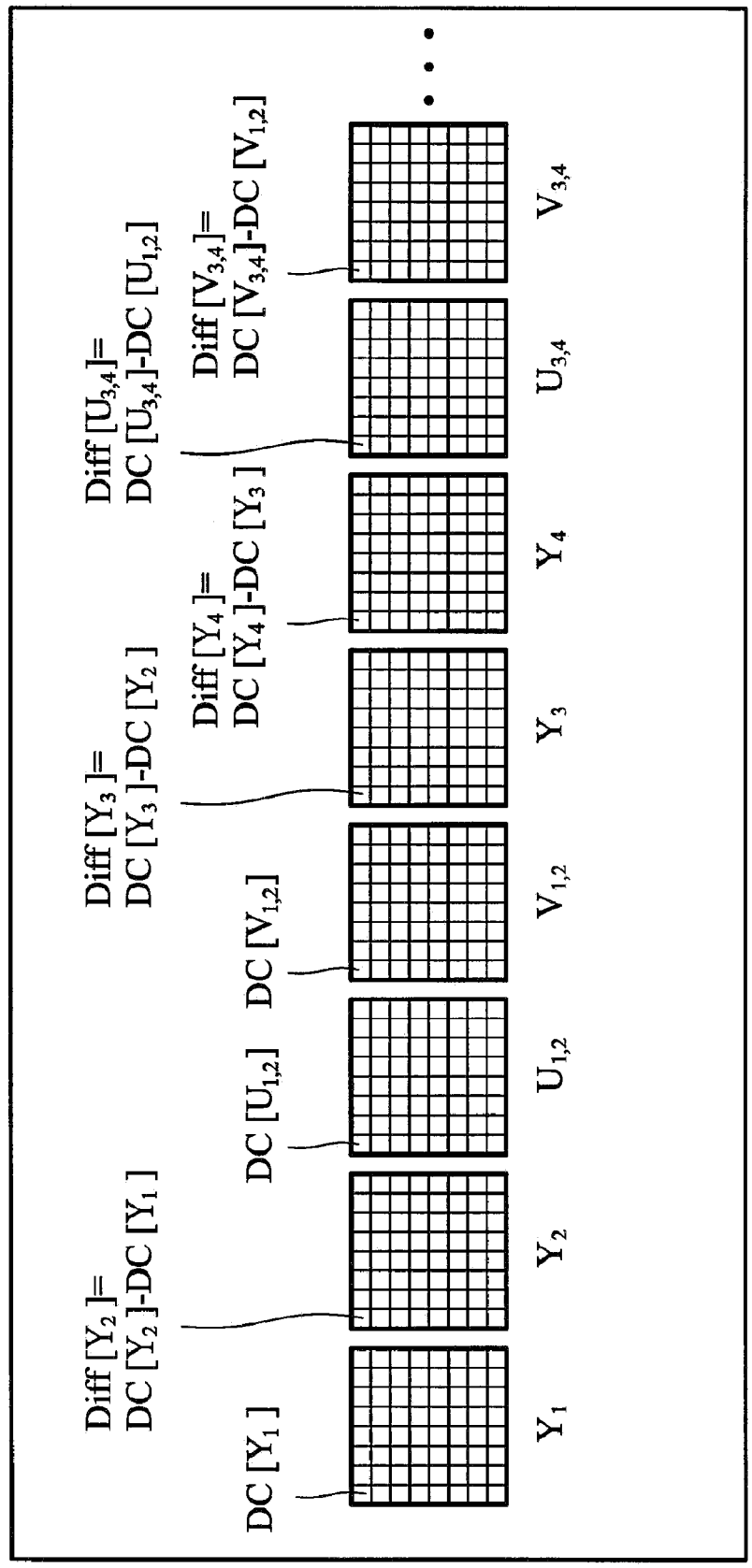
FIG. 7 is a diagram of DC difference calculation for blocks other than the beginning Y, U or V block.
Figure 8:
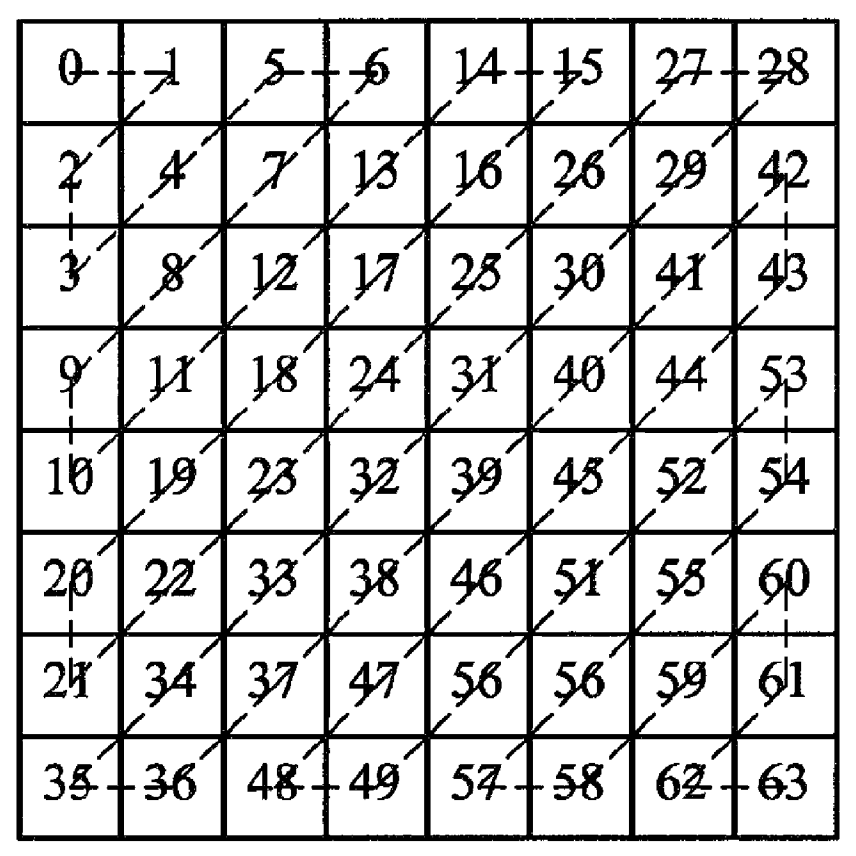

Referring to FIG. 2, in step S250, all the quantized DCT coefficients are sequentially encoded by a zero run-length encoding (RLE) method to generate a RLE code stream. Step S250 subtracts the (0,0) element (i.e. DC coefficient) of each block other than the beginning Y, U or V block from the DC coefficient of the prior Y, U or V block to obtain a DC difference. DC coefficients of blocks other than the beginning Y, U or V block are replaced with the calculated DC differences. FIG. 7 is a diagram of DC difference calculation for blocks other than the beginning Y, U or V block. For instance, the DC difference of block $Y_3$ is Diff[$Y_3$]=DC[$Y_3$]-DC[$Y_2$], the DC difference of block $U_{3,4}$ is Diff[$U_{3,4}$]=DC[$U_{3,4}$]-DC[$U_{1,2}$], and the DC difference of block $V_{3,4}$ is Diff[$V_{3,4}$]=DC[$V_{3,4}$]-DC[$V_{1,2}$]. The quantized DCT coefficients and calculated DC differences in each block in the 8×8 pixel block are sequentially encoded in a zig-zag order as shown in FIG. 8, to generate a RLE code stream. As a result, each luminance or chrominance DC coefficient or difference is encoded into a RLE code combination of a size and amplitude, where the amplitude stores a one's complement of a DC coefficient or a DC difference, and the size stores the length of the amplitude (in bits). Each luminance or chrominance AC coefficient except for the "zero" coefficient is encoded into a RLE code combination of a run-length, a size and an amplitude, where the run-length stores a total number of continuous "zero" AC coefficients following this AC coefficient, the amplitude stores a one's complement of the AC coefficient, the size stores the length of the amplitude (in bits). For example, when seven continuous "zero" AC coefficients follow a "non-zero" AC coefficient, the run-length for the non-zero AC coefficient is "seven".

Figure 9A:
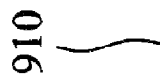

Referring to FIG. 2, in step S260, the generated RLE code stream is encoded by an entropy encoding method with reference to a luminance DC difference mapping table, a luminance AC coefficient mapping table, a chrominance DC difference mapping table and a chrominance AC coefficient mapping table, generating a variable length coding (VLC) bit stream. The entropy encoding method encodes more frequent values with shorter codes. Specifically, the entropy encoding method converts each size of an RLE code combination for a luminance DC difference into a code word (e.g. Huffman code word) with reference to the luminance DC difference mapping table. The size of each RLE combination for a chrominance DC difference is converted into a code word with reference to the chrominance DC difference mapping table. The entropy encoding method converts each run-length/size of a RLE code combination for a luminance "non-zero" AC coefficient into a code word with reference to the luminance AC coefficient mapping table. Each run-length/size of a RLE code combination for a chrominance "non-zero" AC coefficient into a code word with reference to the chrominance AC coefficient mapping table. FIGS. 9a and 9b are diagrams of exemplary luminance DC difference mapping and luminance AC coefficient mapping tables 910 and 930. For example, an RLE combination for a luminance AC coefficient containing a run-length "1", a size "4" and amplitude "0111" is converted into a code word "1111101100111" with reference to the luminance AC coefficient mapping table 930.

Figure 10:
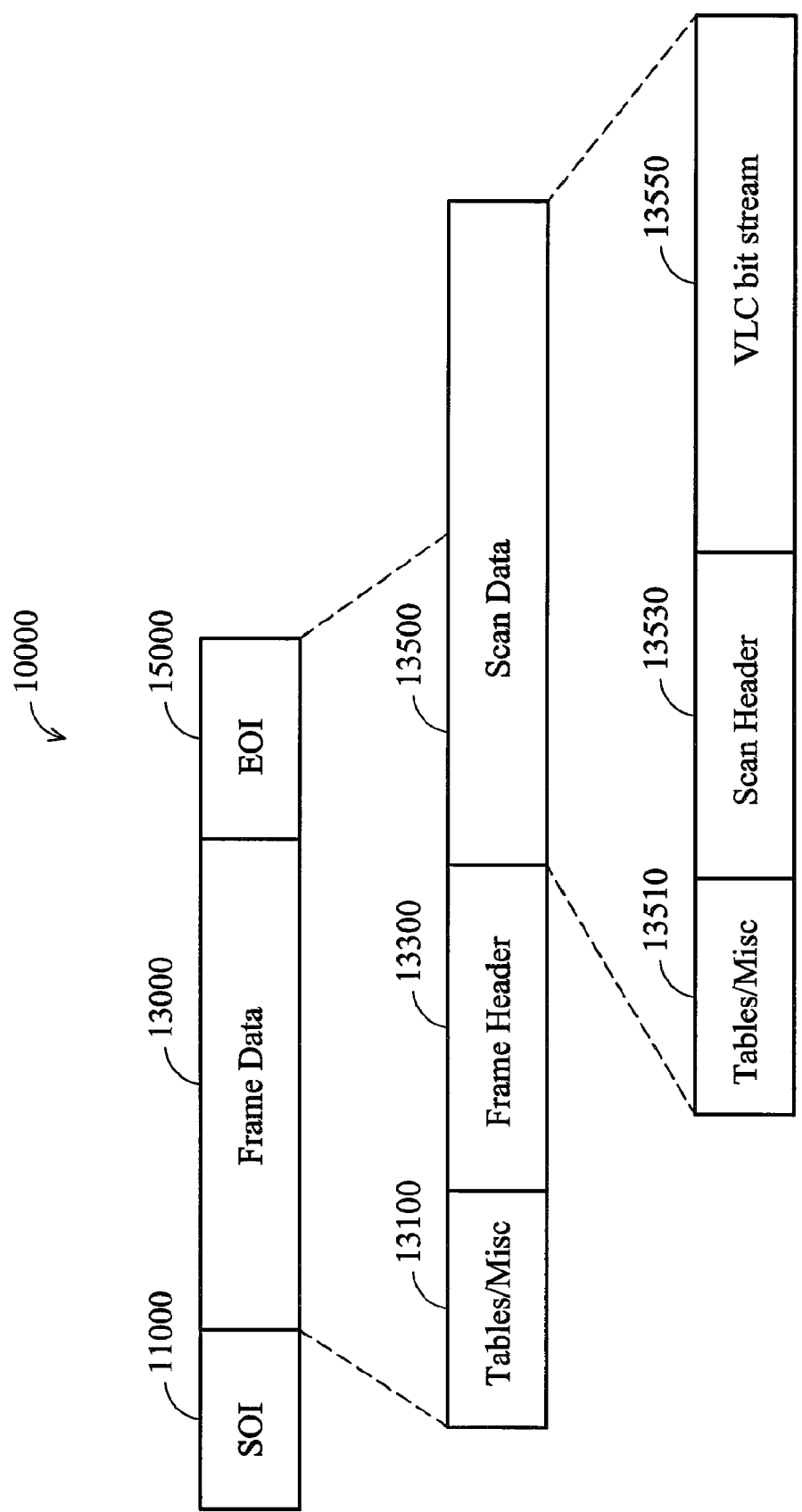
FIG. 10 is a diagram of data structure of an exemplary JPEG image.

Referring to FIG. 2, in step S270, a compressed image (e.g. the source image 200 of FIG. 1) containing the generated VLC bit stream is generated. FIG. 10 is a diagram of the data structure of an exemplary JPEG image 10000 containing two anchors, start-of-image (SOI) 11000 and end-of-image (EOI) 15000, and frame data 13000 therebetween. The frame data 13000 is composed of tables/misc 13100, a frame header 13300 and scan data 13500. The tables/misc 13100 stores the luminance base table 610 (FIG. 6a) and the chrominance base table 630 (FIG. 6b). The scan data 13500 is composed of tables/misc 13510, a scan header 13330 and the generated VLC bit stream 13550. The tables/misc 13510 stores a luminance DC difference mapping table, a luminance AC coefficient mapping table, a chrominance DC difference mapping table and a chrominance AC coefficient mapping table.

Figure 11:
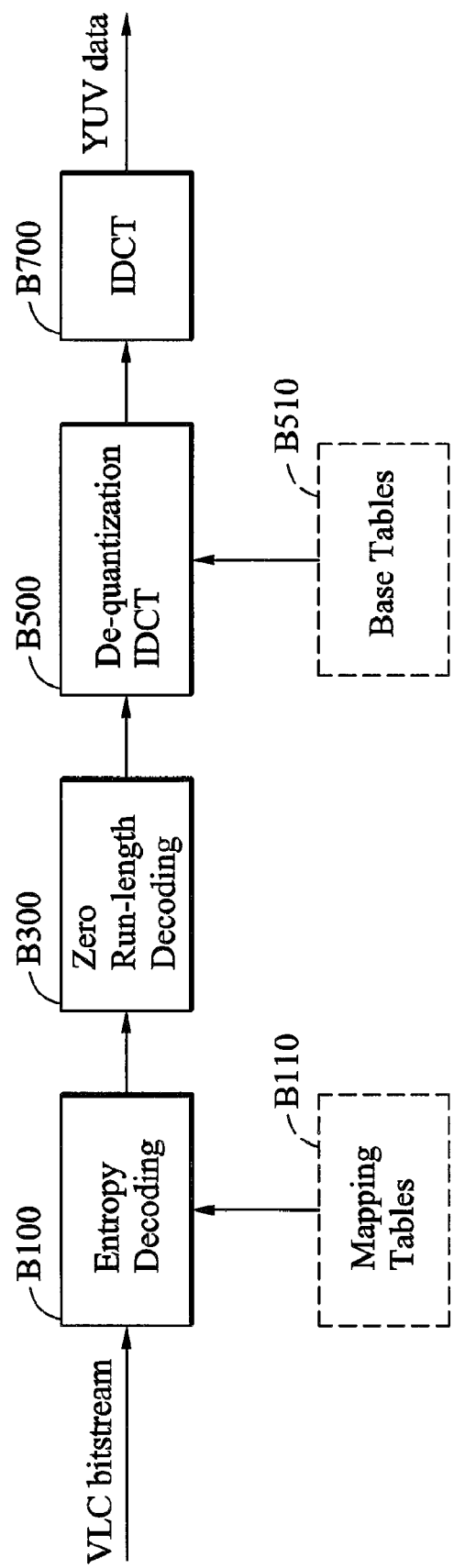
FIG. 11 is a diagram of an exemplary image decoding sequence.

FIG. 11 is a diagram of an exemplary image decoding sequence. The generated VLC bit stream is decoded by sequentially performing an entropy decoding method B100, a zero run-length decoding B300, a de-quantization method B500 and an inverse discrete cosine transform (IDCT) method B700 to generate a decoded image to be displayed on the screen 170 (FIG. 1). Contrary to the step S260 (FIG. 2), the entropy decoding method B10 converts VLC code words (e.g. Huffman codes) of the generated VLC bit stream into RLE codes with reference to mapping tables B110 such as the above luminance DC difference, luminance AC coefficient, chrominance DC difference and chrominance AC coefficient mapping tables, to generate a RLE code stream.

Figure 12:
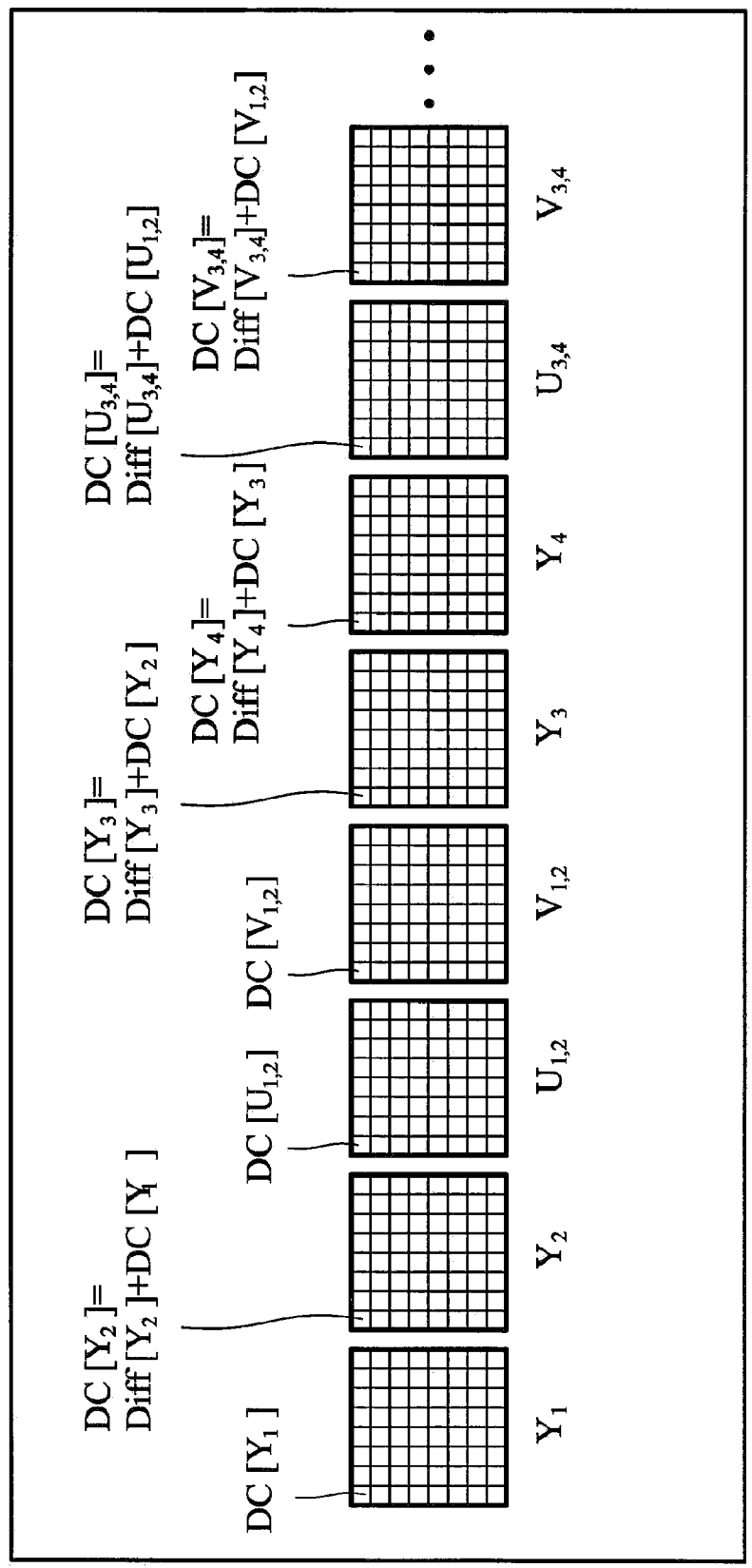
FIG. 12 is a diagram of DC coefficient calculation for blocks other than the beginning Y, U or V block.

Contrary to step S250 (FIG. 2) the zero run-length decoding method B300 decodes the previously generated RLE code stream to generate multiple MCUs respectively containing certain Y, U and V blocks. Each RLE code combination is converted into a Y, U or V DC coefficient or DC difference, or a Y, U or V AC coefficient. For each block, the zig-zag sequence of Y, U or V AC coefficients, as shown in FIG. 8, is rearranged into an original sequence for scanning a block. Thereafter, the beginning Y, U or V block contains one Y, U or V DC coefficient following a series of luminance or chrominance AC coefficients. Each following Y, U or V block contains one Y, U or V DC difference following a series of Y, U or V AC coefficients. The zero run-length decoding method further adds the (0,0) element (i.e. DC difference) of each Y, U or V block other than the beginning Y, U or V block to the DC coefficient of the prior Y, U or V block to obtain a DC coefficient. FIG. 12 is a diagram of DC coefficient calculation for blocks other than the beginning Y, U or V block. For instance, the DC coefficient of block $Y_3$ is $DC[Y_3]=Diff[Y_3]+DC[Y_2]$, the DC coefficient of block $U_{3,4}$ is $DC[U_{3,4}]=Diff[U_{3,4}]+DC[U_{1,2}]$, and the DC coefficient of block $V_{3,4}$ is $DC[V_{3,4}]=Diff[V_{3,4}]+DC[V_{1,2}]$. Note that the decoding results of the current block or MCU (especially the calculated DC coefficient) generated by the entropy decoding and zero run-length decoding methods affect decoding of the subsequent blocks or MCUs.

Contrary to step S240 (FIG. 2), the DC or AC coefficients of each block are de-quantized with reference to the predefined luminance and chrominance base tables such as 610 and 630 of FIG. 6, to generate DCT coefficients. The de-quantization method B500 multiplies each luminance or chrominance DC or AC coefficient $Sq_{uv}$ by a corresponding quantization scale in a luminance base table or a chrominance base table, such as 610 of FIG. 6a or 630 of FIG. 6b, to generate a luminance or chrominance DCT coefficient $S_{vu}$. Each luminance or chrominance DC or AC coefficient $Sq_{vu}$ may be de-quantized by the following de-quantization equation with reference to the luminance base table 610 or the chrominance base table 630:

$$S_{vu}=Sq_{vu} \times Qv_{vu},$$

where $Sq_{vu}$ represents a luminance or chrominance DC or AC coefficient of the v-th row and the u-th column of a chrominance or luminance block, and $Q_{vu}$ represents a quantization scale of the v-th row and the u-th column of a chrominance or luminance block present in the luminance base table 610 or the chrominance base table 630.

Contrary to step S240 (FIG. 2), each DCT coefficient of each Y, U or V block is transformed into Y, U or V data by a inverse discrete cosine transform (IDCT) formula. When a block is composed of 8×8 pixels, Y, U or V data of each pixel in the block may be calculated by the following IDCT formula:

$$S_{yx} = \frac{1}{4} \sum_{x=0}^{7} \sum_{y=0}^{7} C_u C_v S_{vu} \cos\frac{(2x+1)u\pi}{16} \cos\frac{(2y+1)v\pi}{16},$$

where $C_u$, $C_v=1/\sqrt{2}$ for u, v=0, $C_u$, $C_v=1$ for otherwise, and SVU represents a DCT coefficient of the y-th row and the x-th column of a block. Note that the decoding results of the current block or MCU generated by the de-quantization and IDCT methods will not affect decoding of the subsequent blocks or MCUs.

Figure 13:
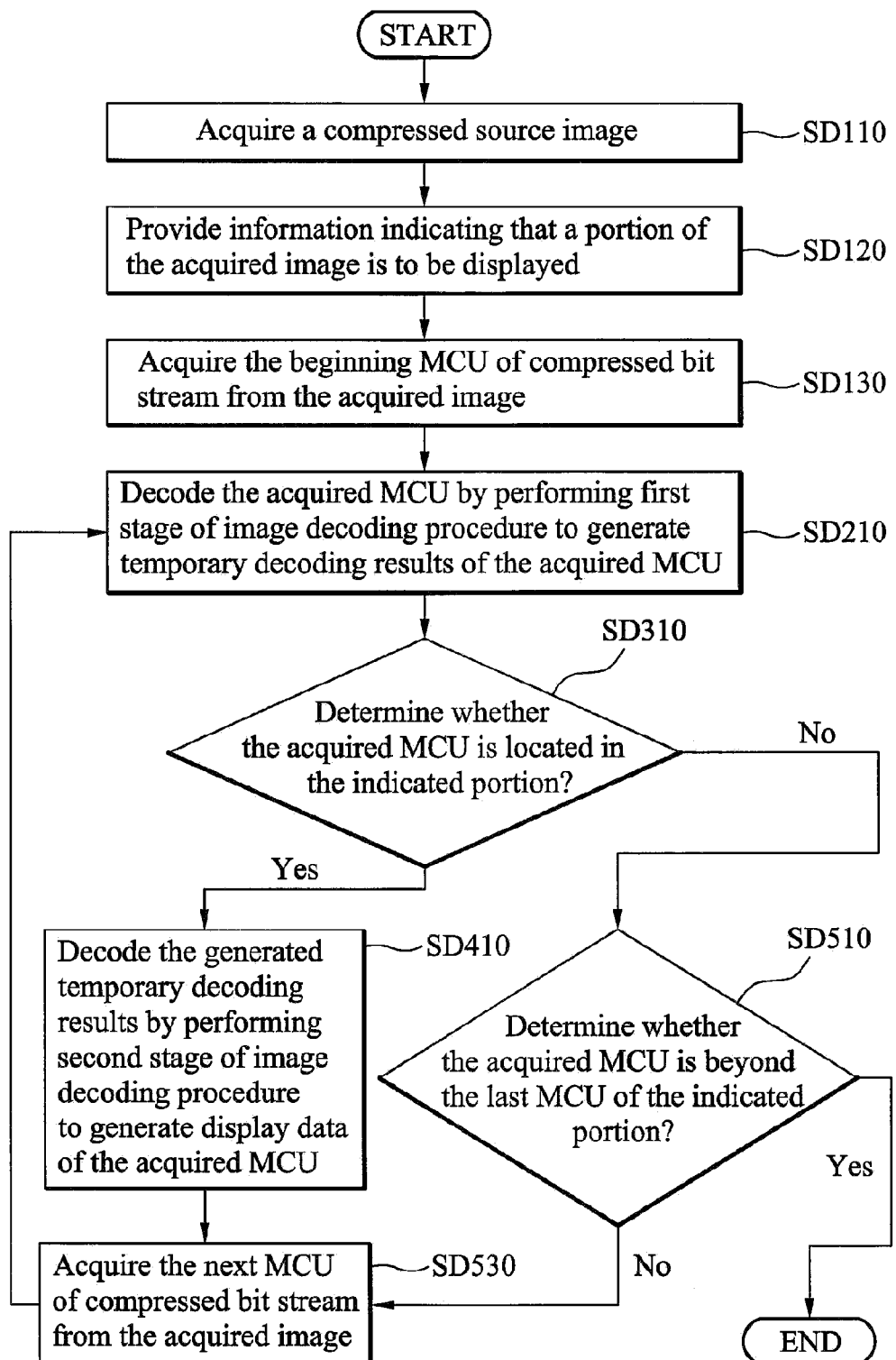
FIG. 13 is a flowchart illustrating an embodiment of a decoding process for decoding a compressed source image.
Figure 14:
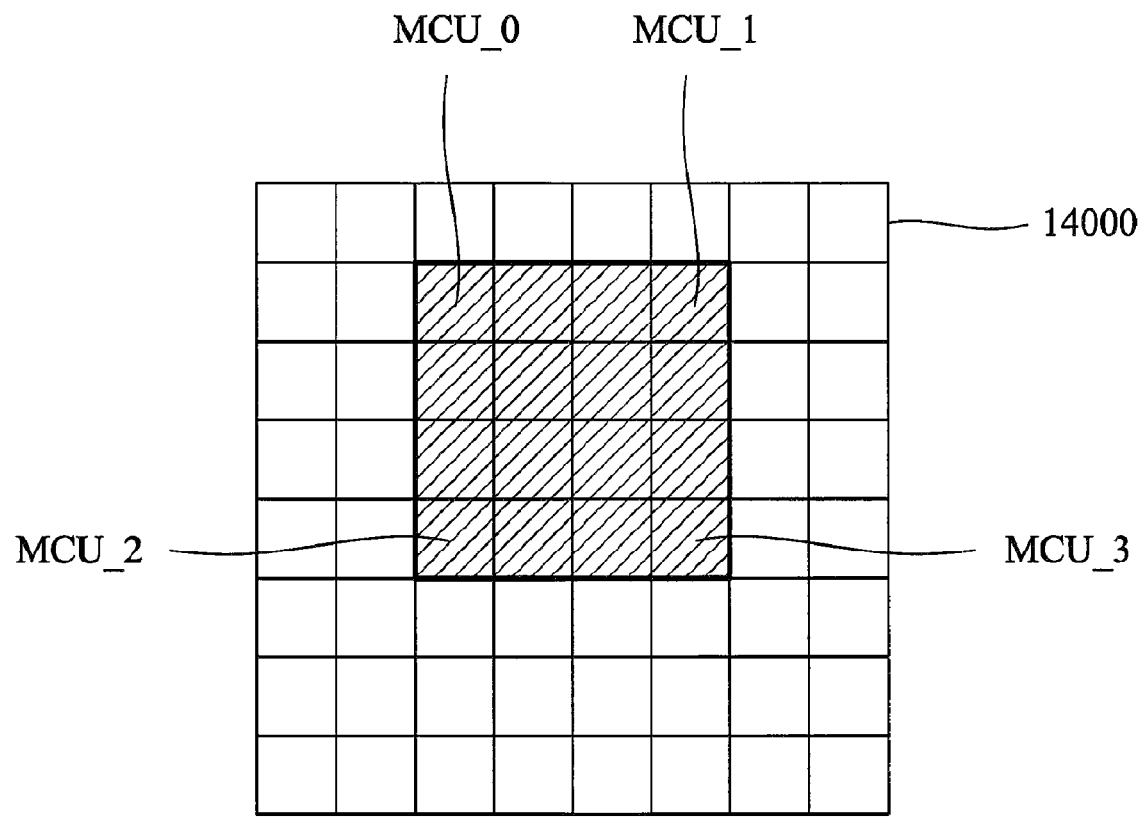
FIG. 14 is a diagram of an exemplary compressed source image containing a portion to be displayed.

FIG. 13 is a flowchart illustrating an embodiment of a decoding process for decoding a source image, e.g. 200 of FIG. 1, performed by the processing unit 110 (FIG. 1). In step SD110, a compressed source image is acquired. In step SD120, information indicating that a selected portion of the acquired image to be displayed is provided. FIG. 14 is a diagram of an exemplary source image 14000 containing a portion to be displayed, where the upper-left, upper-right, lower-left and lower-right MCUs of the portion are referred to as MCU_0, MCU_1, MCU_2 and MCU_3. The indicated portion may be determined by the user's selection for zooming in.

Referring to FIG. 13, in step SD130, the beginning MCU of a bit stream (e.g. a VLC bit stream) is acquired from the acquired image. In step SD210, the acquired MCU are decoded by performing a first stage of a image decoding procedure to generate temporary decoding results of the acquired MCU, where the temporary decoding results are utilized to decode the next MCU of the bit stream and can not be directly displayed. For example, the acquired MCU are decoded by the first stage of the image decoding procedure, sequentially comprising entropy decoding and zero run-length decoding methods, to generate DC coefficients respectively following a series of AC coefficients of each Y, U or V block in the acquired bit stream. Note that DC coefficients of the last Y, U and V blocks in the acquired bit stream is utilized for calculating DC coefficients of the beginning Y, U and V blocks in the next MCU of the bit stream.

In step SD310, it is determined whether the acquired MCU is located in the indicated portion such as the shadow portion of 14000 (FIG. 14). If so, the process proceeds to step SD410 to complete a second stage of the image decoding procedure to generate image data capable of been directly displayed on the screen 170 (FIG. 1), otherwise, to step SD510. In step SD410, the generated temporary decoding results are decoded by performing the second stage of the image decoding procedure to generate display data of the acquired MCU. For example, the DC coefficients and AC coefficients of Y, U or V block of the acquired MCU are decoded by the second stage of the image decoding procedure, sequentially comprising de-quantization and IDCT methods, to generate Y, U or V data of the acquired MCU prepared to be displayed. In step SD510, it is determined whether the acquired MCU is beyond the last MCU of the indicated portion, such as MCU_3 of FIG. 14. If so, the process ends, otherwise, to step SD530. In step SD530, the next MCU of the compressed bit stream is acquired from the acquired image for subsequent decoding. Thus, such determinations performed in steps SD310 and SD410 reduce extra cost for decoding bit streams not to be displayed.

Figure 15A:
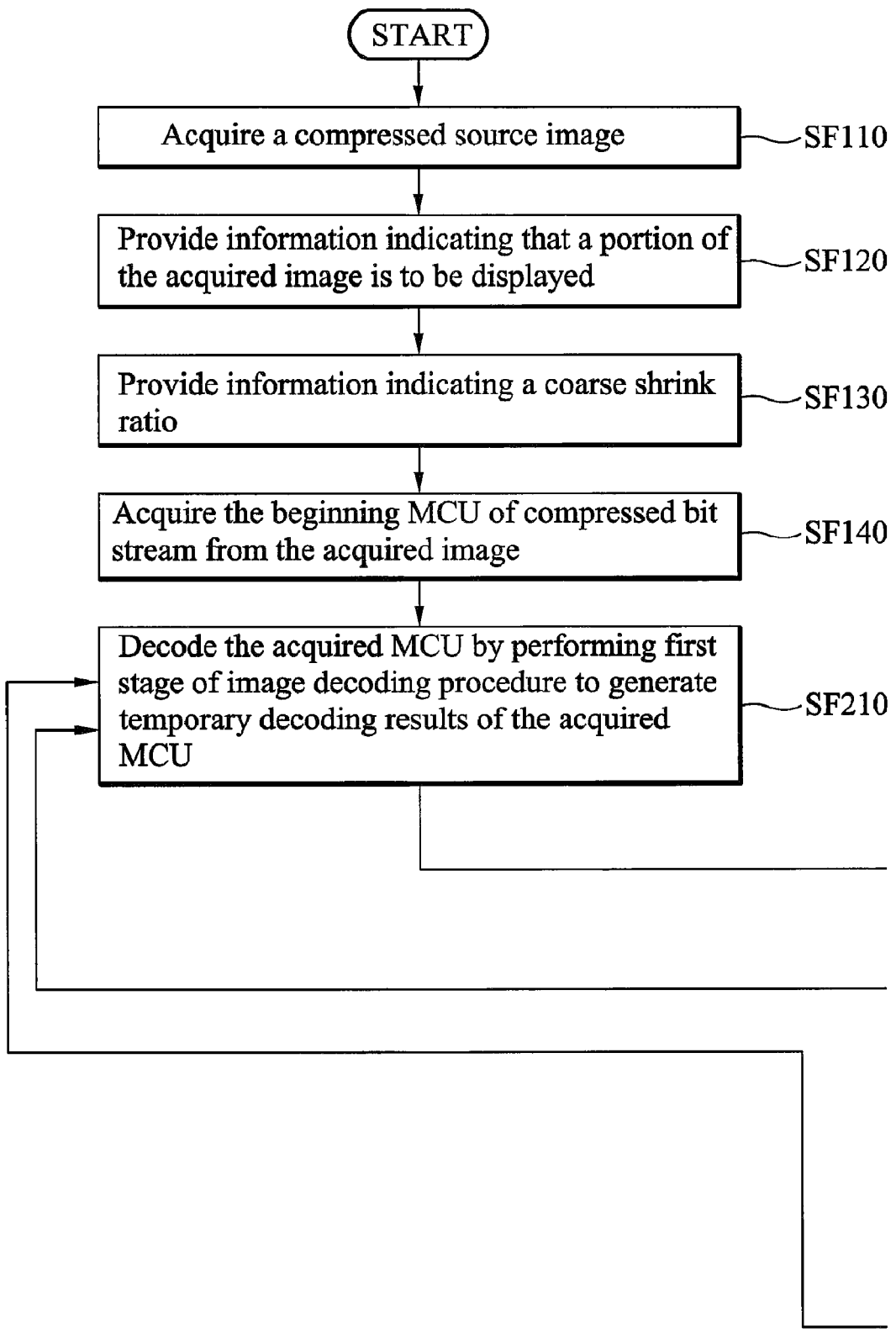
FIGS. 15*a* and 15*b* are flowcharts illustrating an embodiment of a decoding process for decoding a compressed source image.
Figure 15B:
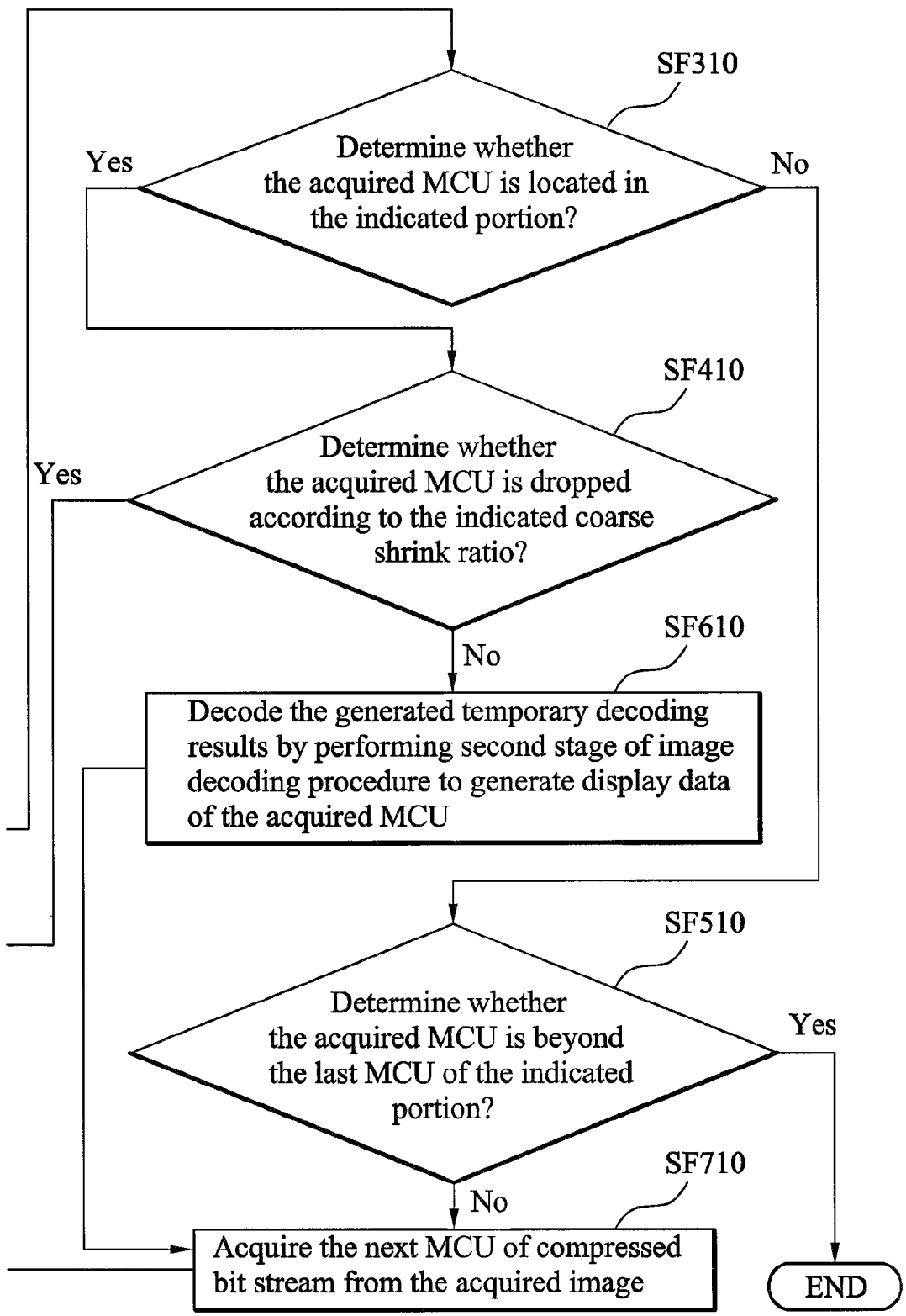
Figure 16:
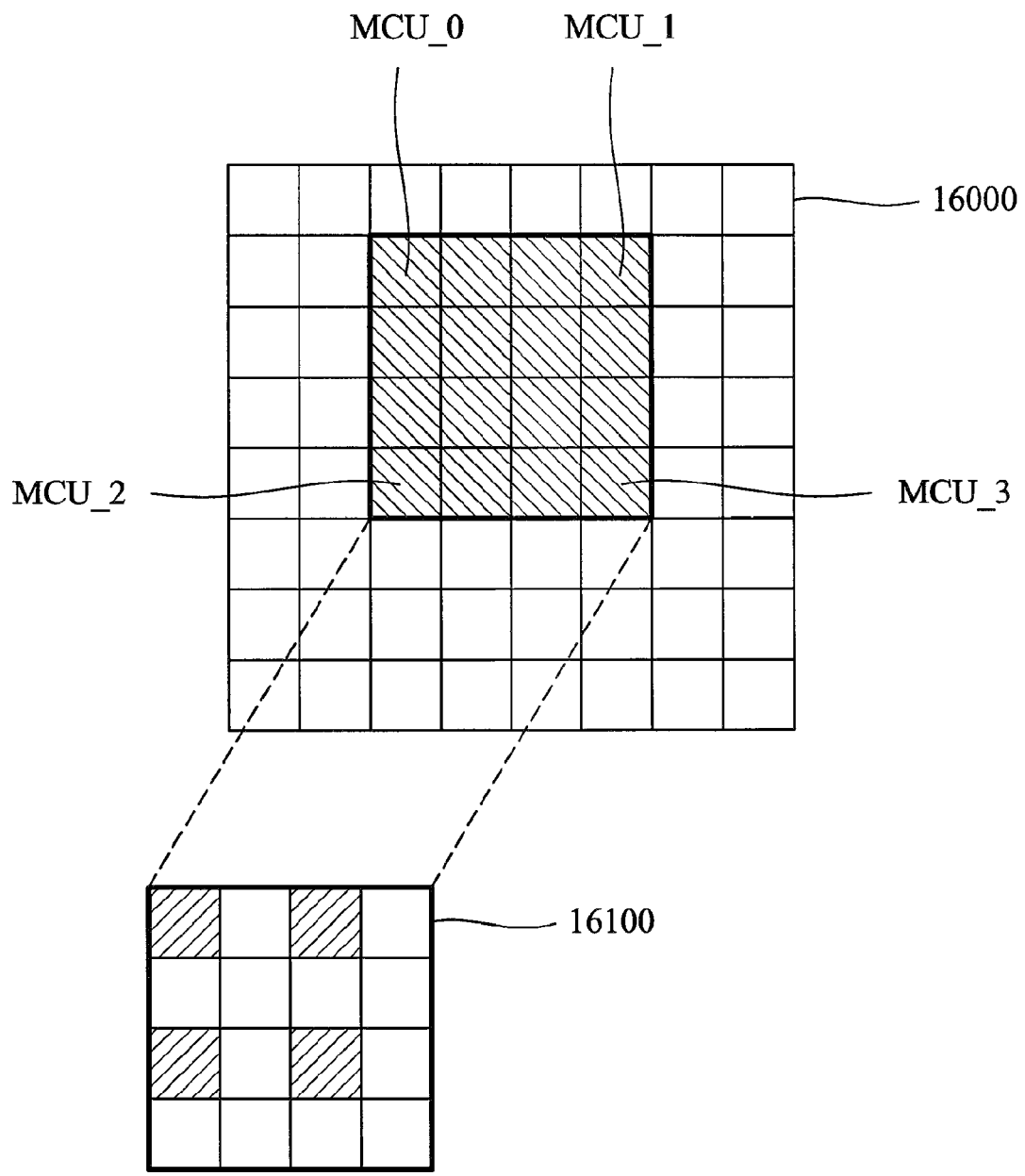
FIG. 16 is a diagram of an exemplary compressed source image containing a portion to be displayed.

FIGS. 15a and 15b are flowcharts illustrating an embodiment of a decoding process for decoding a compressed source image, e.g. 200 of FIG. 1, performed by the processing unit 110 (FIG. 1). In step SF110, a compressed source image is acquired. In step SF120, information indicating that a portion of the acquired image to be displayed is provided. FIG. 16 is a diagram of an exemplary compressed source image 16000 containing a portion to be displayed, where the upper-left, upper-right, lower-left and lower-right MCUs of the portion is referred to as MCU_0, MCU_1, MCU_2 and MCU_3. In step SF130, information indicating a coarse shrink ratio is provided. The indicated coarse shrink ratio may be determined by an image reducing application performed by the processing unit 110 (FIG. 1) to skip certain MCUs when users zoom in an image.

Referring to FIG. 15, in step SF140, the beginning MCU of a compressed bit stream (e.g. a VLC bit stream) is acquired from the acquired image. In step SF210, the acquired MCU is decoded by performing a first stage of a image decoding procedure to generate temporary decoding results of the acquired MCU, where the temporary decoding results are utilized to decode the next MCU of the bit stream and can not be directly displayed. In step SF310, it is determined whether the acquired MCU is located in the indicated portion such as the shadow portion of 16000 (FIG. 16). If so, the process proceeds to step SF410, otherwise, to step SF510. In step SF410, it is determined whether the acquired MCU has to be dropped according to the indicated coarse shrink ratio. If so, the process proceeds to step SF210, otherwise, to step SF610. For example, when the coarse shrink ratio is 1/4, certain non-shadowed MCUs of an indicated portion 16100 (FIG. 16) are dropped. In step SF510, it is determined whether the acquired MCU is beyond the last MCU of the indicated portion. If so, the process ends, otherwise, proceeds to step SF710. In step SF610, the generated temporary decoding results are decoded by performing a second stage of the image decoding procedure to generate display data of the acquired MCU. In step SF710, the next MCU of the compressed bit stream is acquired from the acquired image for subsequent decoding. Thus, such determinations performed in steps SF310, SF410 and SF510 reduce extra cost for decoding bit streams not to be displayed.

Methods for decoding large images, or certain aspects or portions thereof, may take the form of program codes (i.e., instructions) embodied in tangible media, such as floppy diskettes, CD-ROMS, hard drives, or any other machine-readable storage medium, wherein, when the program codes are loaded into and executed by a machine, such as a computer, a DVD recorder or similar, the machine becomes an apparatus for practicing the invention. The disclosed methods may also be embodied in the form of program codes transmitted over some transmission medium, such as electrical wiring or cabling, through fiber optics, or via any other form of transmission, wherein, when the program codes are received and loaded into and executed by a machine, such as a computer, the machine becomes an apparatus for practicing the invention. When implemented on a general-purpose processor, the program codes combine with the processor to provide a unique apparatus that operate analogously to specific logic circuits.

Certain terms are used throughout the description and claims to refer to particular system components. As one skilled in the art will appreciate, consumer electronic equipment manufacturers may refer to a component by different names. This document does not intend to distinguish between components that differ in name but not function.

Although the invention has been described in terms of preferred embodiment, it is not limited thereto. Those skilled in the art can make various alterations and modifications without departing from the scope and spirit of the invention. Therefore, the scope of the invention shall be defined and protected by the following claims and their equivalents.

What is claimed is:

1. A method for decoding an image performed by a portable electronic device, comprising:

acquiring a minimum code unit (MCU) of a bit stream of an image;

decoding the acquired bit stream by performing a first stage of a image decoding procedure to generate a temporary decoding result of the acquired bit stream;

determining whether the MCU requires to be displayed; and decoding the generated temporary decoding result by performing a second stage of the image decoding procedure to generate display data of the acquired MCU when the MCU requires to be displayed, wherein the temporary decoding result of the acquired MCU is utilized to decode another MCU of the bit stream.

2. The method as claimed in claim 1 further comprising providing information indicating that a portion of the image is to be displayed, wherein the step of determining whether the MCU requires display further comprises determining whether the MCU of the image is located in the portion of the image.

3. The method as claimed in claim 1 further comprising:

providing information indicating that a portion of the image is to be displayed;

determining whether the MCU of the image is beyond a last MCU of the portion when the MCU does not require display; and ignoring the remaining MCUs of the bit stream when the MCU of the image is beyond the last MCU of the portion.

4. The method as claimed in claim 1 further comprising:

providing information indicating that a portion of the image is to be displayed; and providing information indicating a coarse shrink ratio, wherein the step of determining whether the MCU requires display further comprises determining whether the MCU of the image is located in the portion of the image and is not dropped according to the indicated coarse shrink ratio.

5. The method as claimed in claim 1 wherein the first stage of the image decoding procedure sequentially comprise an entropy decoding method and a zero run-length decoding method, and the second stage of the image decoding procedure sequentially comprise a de-quantization method and an inverse discrete cosine transform (IDCT) method.

6. The method as claimed in claim 5 wherein the entropy decoding method converts a plurality of code words of the acquired bit stream into a plurality of sizes of run-length encoding (RLE) code combinations for a plurality of luminance DC differences and chrominance DC differences and converts a plurality of code words of the acquired bit stream into a plurality of run-length/size combinations of RLE code combinations for a plurality of luminance AC coefficients and chrominance AC coefficients to generate a RLE code stream, the zero run-length decoding method converts the converted RLE code combinations of the RLE code stream into a Y DC coefficient following a series of Y AC coefficients for a Y block, a U DC coefficient following a series of U AC coefficients for a U block, and a V DC coefficient following a series of V AC coefficients, the de-quantization method de-quantizes the DC and AC coefficients of each block to generate a plurality of discrete cosine transform (DCT) coefficients of each block, and the IDCT method transforms each DCT coefficient of each block into Y, U or V data of each block.

7. The method as claimed in claim 6 wherein the code words are Huffman codes, and the entropy decoding method converts a plurality of code words of the acquired bit stream for a plurality of luminance DC differences into a plurality of sizes of RLE code combinations with reference to a luminance DC difference mapping table comprising information indicating each code word corresponds to a particular size of luminance DC difference, converts a plurality of code words of the acquired bit stream for a plurality of chrominance DC differences into a plurality of sizes of RLE code combinations with reference to a chrominance DC difference mapping table comprising information indicating each code word corresponds to a particular size of chrominance DC difference, converts a plurality of codes words of the acquired bit stream for a plurality of luminance AC coefficients into a plurality of run-length/size combinations with reference to a luminance AC coefficient mapping table comprising information indicating each code word corresponds to a particular run-length/size combination of luminance AC coefficient, and converts a plurality of codes words of the acquired bit stream for a plurality of chrominance AC coefficients into a plurality of run-length/size combinations with reference to a chrominance AC coefficient mapping table comprising information indicating each code word corresponds to a particular run-length/size combination of chrominance AC coefficient.

8. The method as claimed in claim 6 wherein the de-quantization method generates the discrete cosine transform (DCT) coefficients of each block by a de-quantization equation:

$Svu = Sqvu \times Qvu$,

Sqvu representing a luminance or chrominance DC or AC coefficient of the v-th row and the u-th column of a block, and Qvu represents a quantization scale of the v-th row and the u-th column of a block present in a luminance base table or a chrominance base table.

9. The method as claimed in claim 6 wherein the IDCT method transforms each DCT coefficient of each block by an IDCT formula:

$$S_{yx} = \frac{1}{4} \sum_{x=0}^{7} \sum_{y=0}^{7} C_u C_v S_{vu} \cos \frac{(2x+1)u\pi}{16} \cos \frac{(2y+1)v\pi}{16},$$

where Cu, Cv=1/√2 for u, v=0, Cu, Cv=1 for otherwise, and Svu represents a DCT coefficient of the y-th row and the x-th column of a block.

10. The method as claimed in claim 1 wherein the MCU comprises at least one Y, at least one U and at least one V blocks.

11. A system for decoding large images in a portable electronic device comprising:
a screen; and
a processing unit coupling to the screen, acquiring a minimum code unit (MCU) of a compressed bit stream of an image, decoding the acquired bit stream by performing a first stage of a image decoding procedure to generate a temporary decoding result of the acquired bit stream, determining whether the MCU requires display, and, if so, decoding the generated temporary decoding result by performing a second stage of the image decoding procedure to generate display data of the acquired MCU and displaying the generated display data on the screen,
wherein the temporary decoding result of the acquired MCU is utilized to decode another MCU of the bit stream.

12. The system as claimed in claim 11 wherein the processing unit further provides information indicating that a portion of the image is to be displayed, determines whether the MCU of the image is located in the portion of the image, and, if so, decodes the generated temporary decoding result by sequentially performing the remaining number of the image decoding methods to generate display data of the acquired bit stream and displays the generated display data on the screen.

13. The system as claimed in claim 11 wherein the processing unit further provides information indicating that a portion of the image is to be displayed, determines whether the MCU of the image is beyond a last MCU of the portion when the MCU does not require display, and ignores the remaining MCUs of the bit stream when the MCU of the image is beyond the last MCU of the portion.

14. The system as claimed in claim 11 wherein the processing unit provides information indicating that a portion of the image is to be displayed, provides information indicating a coarse shrink ratio, determines whether the MCU of the image is located in the portion of the image and is not dropped according to the indicated coarse shrink ratio, and, if so, decodes the generated temporary decoding result by performing the second stage of the image decoding procedure to generate display data of the acquired MCU and displays the generated display data on the screen.

15. The system as claimed in claim 11 wherein the first stage of the image decoding procedure sequentially comprise an entropy decoding method and a zero run-length decoding method, and the second stage of the image decoding procedure sequentially comprise a de-quantization method and an inverse discrete cosine transform (IDCT) method.

16. The system as claimed in claim 15 wherein the entropy decoding method converts a plurality of code words of the acquired bit stream into a plurality of sizes of run-length encoding (RLE) code combinations for a plurality of luminance DC differences and chrominance DC differences and converts a plurality of code words of the acquired bit stream into a plurality of run-length/size combinations of RLE code combinations for a plurality of luminance AC coefficients and chrominance AC coefficients to generate a RLE code stream, the zero run-length decoding method converts the converted RLE code combinations of the RLE code stream into a Y DC coefficient following a series of Y AC coefficients for a Y block, a U DC coefficient following a series of U AC coefficients for a U block, and a V DC coefficient following a series of V AC coefficients, the de-quantization method de-quantizes the DC and AC coefficients of each block to generate a plurality of discrete cosine transform (DCT) coefficients of each block, and the IDCT method transforms each DCT coefficient of each block into Y, U or V data of each block.

17. The system as claimed in claim 16 wherein the code words are Huffman codes, and the entropy decoding method converts a plurality of code words of the acquired bit stream for a plurality of luminance DC differences into a plurality of sizes of RLE code combinations with reference to a luminance DC difference mapping table comprising information indicating each code word corresponds to a particular size of luminance DC difference, converts a plurality of code words of the acquired bit stream for a plurality of chrominance DC differences into a plurality of sizes of RLE code combinations with reference to a chrominance DC difference mapping table comprising information indicating each code word corresponds to a particular size of chrominance DC difference, converts a plurality of codes words of the acquired bit stream for a plurality of luminance AC coefficients into a plurality of run-length/size combinations with reference to a luminance AC coefficient mapping table comprising information indicating each code word corresponds to a particular run-length/size combination of luminance AC coefficient, and converts a plurality of codes words of the acquired bit stream for a plurality of chrominance AC coefficients into a plurality of run-length/size combinations with reference to a chrominance AC coefficient mapping table comprising information indicating each code word corresponds to a particular run-length/size combination of chrominance AC coefficient.

18. The system as claimed in claim 16 wherein the de-quantization method generates the discrete cosine transform (DCT) coefficients of each block by a de-quantization equation:

$$Svu = Sqvu \times Qvu,$$

Sqvu representing a luminance or chrominance DC or AC coefficient of the v-th row and the u-th column of a block, and Qvu represents a quantization scale of the v-th row and the u-th column of a block present in a luminance base table or a chrominance base table.

19. The system as claimed in claim 16 wherein the IDCT method transforms each DCT coefficient of each block by an IDCT formula:

$$S_{yx} = \frac{1}{4} \sum_{x=0}^{7} \sum_{y=0}^{7} C_u C_v S_{vu} \cos\frac{(2x+1)u\pi}{16} \cos\frac{(2y+1)v\pi}{16},$$

where Cu, Cv=1/√2 for u, v=0, Cu, Cv=1 for otherwise, and Svu represents a DCT coefficient of the y-th row and the x-th column of a block.

20. The system as claimed in claim 11 wherein the MCU comprises at least one Y, at least one U and at least one V blocks.

* * * * *